United States Patent
Graf et al.

(10) Patent No.: US 12,339,364 B2
(45) Date of Patent: Jun. 24, 2025

(54) REALITY CAPTURE DEVICE WITH DIFFERENT CLIMATE ZONES FOR COOLING

(71) Applicant: LEICA GEOSYSTEMS AG, Heerbrugg (CH)

(72) Inventors: Roland Graf, Untereggen (CH); Roman Steffen, Rebstein (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1031 days.

(21) Appl. No.: 17/362,268

(22) Filed: Jun. 29, 2021

(65) Prior Publication Data
US 2021/0405198 A1 Dec. 30, 2021

(30) Foreign Application Priority Data
Jun. 30, 2020 (EP) ..................................... 20183235

(51) Int. Cl.
*G01S 7/481* (2006.01)
*G01S 17/89* (2020.01)

(52) U.S. Cl.
CPC ............ *G01S 17/89* (2013.01); *G01S 7/4813* (2013.01); *G01S 7/4814* (2013.01); *G01S 7/4817* (2013.01)

(58) Field of Classification Search
None
See application file for complete search history.

(56) References Cited

U.S. PATENT DOCUMENTS

| 10,131,201 B1 * | 11/2018 | Yeomans | B60H 1/00271 |
| 10,591,603 B2 * | 3/2020 | Nagalla | G01C 15/00 |
| 10,869,406 B1 * | 12/2020 | Diehl | G01S 7/497 |

(Continued)

FOREIGN PATENT DOCUMENTS

| CN | 102884877 A | 1/2013 |
| CN | 207 301 317 U | 5/2018 |

(Continued)

OTHER PUBLICATIONS

Extended European Search Report dated Oct. 30, 2020 as received in Application No. 20183235.9.

(Continued)

*Primary Examiner* — Xanthia C Relford
(74) *Attorney, Agent, or Firm* — Maschoff Brennan

(57) ABSTRACT

The invention relates to a reality capture device for generating a digital three-dimensional representation of an environment, particularly for surveying or monitoring an infrastructure. The reality capture device comprises a laser scanner and a housing enclosing an internal space, which has a first and a second climate zone. The reality capture device has a common air circulation element to provide active air circulation through an air guiding arrangement, wherein the air guiding arrangement is configured in such a way that different air flow characteristics of the active air circulation are achieved with respect to different regions associated with cooling of the two different climate zones. The first climate zone is configured to be free of active air circulation and the second climate zone is configured to have active air circulation for directing air to the inside part of a corresponding heat dissipation element.

14 Claims, 3 Drawing Sheets

(56) References Cited

U.S. PATENT DOCUMENTS

| | | | |
|---|---|---|---|
| 2013/0112373 A1 | 5/2013 | Fukai et al. | |
| 2014/0036079 A1* | 2/2014 | Lang | B60R 1/0602 |
| | | | 348/148 |
| 2019/0210423 A1* | 7/2019 | Ghannam | B60H 1/00271 |
| 2019/0353793 A1 | 11/2019 | Baldovino et al. | |
| 2020/0174100 A1 | 6/2020 | Hori et al. | |
| 2022/0183192 A1 | 6/2022 | Peng et al. | |

FOREIGN PATENT DOCUMENTS

| | | |
|---|---|---|
| CN | 109906021 A | 6/2019 |
| CN | 110545648 A | 12/2019 |
| JP | 2009-200912 A | 9/2009 |
| WO | 2020/126123 A2 | 6/2020 |

OTHER PUBLICATIONS

CN Office Action dated Dec. 20, 2024 as received in Application No. 202110704859.0.

* cited by examiner

REALITY CAPTURE DEVICE WITH DIFFERENT CLIMATE ZONES FOR COOLING

BACKGROUND

The present invention relates to a reality capture device for generating a digital three-dimensional representation of an environment, particularly for surveying or monitoring an infrastructure.

Reality capture devices often make use of a variety of different sensors. For example, an arrangement of different cameras, e.g. comprising a visual and a thermal camera, may be used for providing day and night time surveying and monitoring capability. The different sensors further provide different information enabling improved object identification and detection of critical events, e.g. based on visual appearance and temperature.

Lidar (light detection and ranging) technology may be used to create light barriers for intrusion detection or to create motion sensors for movement detection.

A laser scanning unit may be used to generate a 3D point cloud of the infrastructure for surveying or monitoring the infrastructure and objects within the infrastructure in three dimensions. In case of monitoring, for example, this enables 3D change detection and 3D object tracking under any light conditions.

By way of example, reality capture devices are used to monitor neuralgic points within a city, such as railway stations, airports, city parks, or otherwise busy public places. Reality capture devices are further used to monitor or safeguard restricted or dangerous areas, e.g. industrial plants, construction sites, or business complexes.

Nowadays increasingly standardized, reality capture devices are used in modern surveillance systems being able to autonomously identify objects and/or situations related to the scene to be monitored, e.g. for automatically raising an alarm or for flagging a scene to be reviewed by a human operator. For example, a distributed network of reality capture devices is used, configured for automatically identifying and tracking persons or otherwise moving objects, e.g. cars, such that the path of the moving object can be automatically followed by using data of the network of reality capture devices.

By way of another example, reality capture devices are used to support operation of a facility, e.g. supervision of a warehouse or a car park.

In the field of surveying, reality capture devices are of interest for architects or craftsmen in order to quickly assess an actual condition of a room or a construction progress of a construction site, respectively, e.g. to efficiently plan the next work steps. By means of a digital visualization of the actual state, e.g. in the form of a point cloud or a vector file model, or by means of an augmented reality functionality different options for further steps or expansion options can be examined and optionally presented to an employee or a customer in an easily accessible way.

The referencing and fusion of different data types, e.g. laser scanner data, camera data, and positioning data such as from a global navigation satellite system, is now increasingly standardized.

In particular, reality capture devices may be mobile and configured to provide surveying data and referencing data at the same time, e.g. wherein at least trajectory data of the device, e.g. position and/or pose data, are provided with the probing data, e.g. laser scanner data and/or camera data, such that probing data of different positions of the reality capture device can be combined into a common coordinate system. Often, reality capture devices are configured to autonomously create a 3D map of a new environment, e.g. by means of a simultaneous localization and mapping (SLAM) functionality.

The three-dimensional model data may then be analyzed by means of a feature recognition algorithm to automatically recognize semantic and/or geometric features captured by the probing data, e.g. by means of using shape information provided by virtual object data from a CAD model. Such feature recognition, particularly for recognizing geometric primitives, are nowadays widely used to analyze 3D data.

The trend to increase functionalities of modern reality capture devices, for example, leads to an increased demand of a compact fusion of complex sensor technologies coming with miniaturization of electronics and optical components. At the same time, lifetime of the reality capture device has to be maintained or increased.

While the development of miniaturized electronic and optical components brings forward the miniaturization and compact design of a reality capture device, heat generation within the device remains to be a problem and cooling efforts of critical components essentially remain the same or even increase. For example, the lifetime of the reality capture device and the handling of the device are linked to the temperature control of the reality capture device.

SUMMARY

It is an object of the present invention to provide an improved reality capture device, which is more compact and easier to use.

Another object of the invention is to provide a more compact reality capture device while at the same time the robustness and lifetime of the device is increased.

At least parts of these objects are achieved by realizing the features of the independent claims. Features which further develop the invention in an alternative or advantageous manner are described in the dependent patent claims.

The invention relates to a reality capture device for generating a digital representation of an environment, the reality capture device comprising a laser scanner and a housing enclosing an internal space, which comprises at least part of the laser scanner. The laser scanner is configured to provide a scanning movement of a laser measurement beam for generating lidar data, which, for example, can be used for generating a three-dimensional model such as a three-dimensional point cloud or a three-dimensional mesh.

The reality capture device is configured such that the internal space has a first climate zone and a second climate zone. By way of example, the second climate zone provides a cooling capacity (for cooling components arranged inside the second climate zone) that differs from that of the first climate zone (for cooling components arranged inside the first climate zone). Thus, such use of two different climate zones enables beneficial grouping of different heat sources with different cooling requirements, which provides for optimized cooling of a reality capture device, particularly a reality capture device of a compact design.

By way of another example, during operation of the reality capture device, the second climate zone provides for a nominal temperature range which is different from that of the first climate zone.

For example, the two climate zones may be thermally separated from each other by an insulating layer and/or by being configured and arranged relative to each other such that air circulation between the two zones is prevented.

Each of the climate zones is connected to a corresponding heat dissipation element and each heat dissipation element is configured to transport heat from an inside part of the heat dissipation element arranged inside the corresponding climate zone to an outside part of the heat dissipation element arranged outside the corresponding climate zone.

The heat dissipation element may be configured for passively transporting heat, e.g. wherein the heat dissipation element comprises a heat pipe being in thermal contact with the corresponding climate zone and being connected to outer cooling ribs. The heat dissipation element may also be configured for actively pumping heat from one end to the other, e.g. based on the Peltier effect, and thus to actively generate a temperature gradient from one end to the other.

According to one aspect of the invention, the reality capture device has a common air circulation element, e.g. a common fan, configured to provide active air circulation through an air guiding arrangement for cooling the outside parts of the heat dissipation elements, wherein the air guiding arrangement is configured in such a way that different air flow characteristics of the active air circulation are achieved with respect to different regions associated with cooling of the outside parts of the heat dissipation elements (the region associated with cooling of the outside part of the heat dissipation element connected to the first climate zone being different from the region associated with cooling of the outside part of the heat dissipation element connected to the second climate zone).

According to another aspect of the invention, either separately or in combination with the above aspect, the first climate zone is configured to be free of active air circulation and the second climate zone is configured to have active air circulation for directing air to the inside part of the corresponding heat dissipation element.

By way of example, the two different climate zones are connected by thermal conduction with two different regions of the air guiding arrangement, wherein the outside parts of the heat dissipation elements are configured as cooling ribs or cooling fins (or the like) being exposed to the air flow generated by the common air circulation element.

In order to generate the different air flow characteristics in the different regions, for example, the air guiding arrangement comprises air ducts of different shape and/or dimensions, e.g. wherein the cross-section of the air ducts differs for different regions.

In particular, the air ducts of the air guiding arrangement may be formed/defined by specifically arranging and shaping cooling elements such as cooling ribs or cooling fins in order to provide for the different air flow characteristics. Alternatively, the different air flow characteristics may be generated by an air guiding arrangement being independent of the arrangement and shape of the cooling elements.

In one embodiment, the air guiding arrangement comprises sections which are insulated against heat conduction from one to the other, particularly wherein the second climate zone is connected by thermal conduction to a section of the air guiding arrangement which is insulated against heat conduction from the rest of the air guiding arrangement.

In a further embodiment, the air guiding arrangement extends on a lateral surface of the reality capture device at least along a part of the circumference around a standing axis of the reality capture device. In particular, the air guiding arrangement extends along the entire circumference around the standing axis.

In a further embodiment, the air guiding arrangement comprises cooling ribs associated with the cooling of the outside parts of the heat dissipation elements, wherein the cooling ribs have varying spacing between each other. For example, the cooling ribs are arranged at least along a part of the circumference around the standing axis on the lateral surface of the reality capture device and the spacing between the cooling ribs varies along the circumference.

For example, the spacing between cooling ribs configured for cooling of the second climate zone is smaller than the spacing between cooling ribs configured for cooling of the first climate zone.

In a further embodiment, the first climate zone comprises at least part of the electronics of the laser scanner, particularly a computing unit for controlling the laser scanner and/or for data processing, e.g. for processing the lidar data or laser scanner data comprising the lidar data and angular data of the scanning movement of the laser measurement beam.

In a further embodiment, the laser scanner has a static section being comprised in the first climate zone and being free of rotating parts of the laser scanner.

In a further embodiment, the second climate zone comprises at least one of: a radiation source for generating the laser measurement beam, an optical component configured to interact with the laser measurement beam, e.g. a deflection element such as a rotating mirror, and a detector for receiving at least part of the laser measurement beam.

In a further embodiment, the laser scanner has a moving section being comprised in the second climate zone and comprising rotating parts for providing the scanning movement of the laser measurement beam.

In a further embodiment, the second climate zone is sealed off with at least IP67 against external penetration.

In a further embodiment, the heat dissipation element of the second climate zone is configured to actively generate a heat transfer from the inside part to the outside part of the heat dissipation element, e.g. based on the Peltier effect.

In a further embodiment, the reality capture device comprises an insulating arrangement insulating the second climate zone against heat conduction from the rest of the reality capture device.

BRIEF DESCRIPTION OF THE DRAWINGS

The reality capture device according to the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
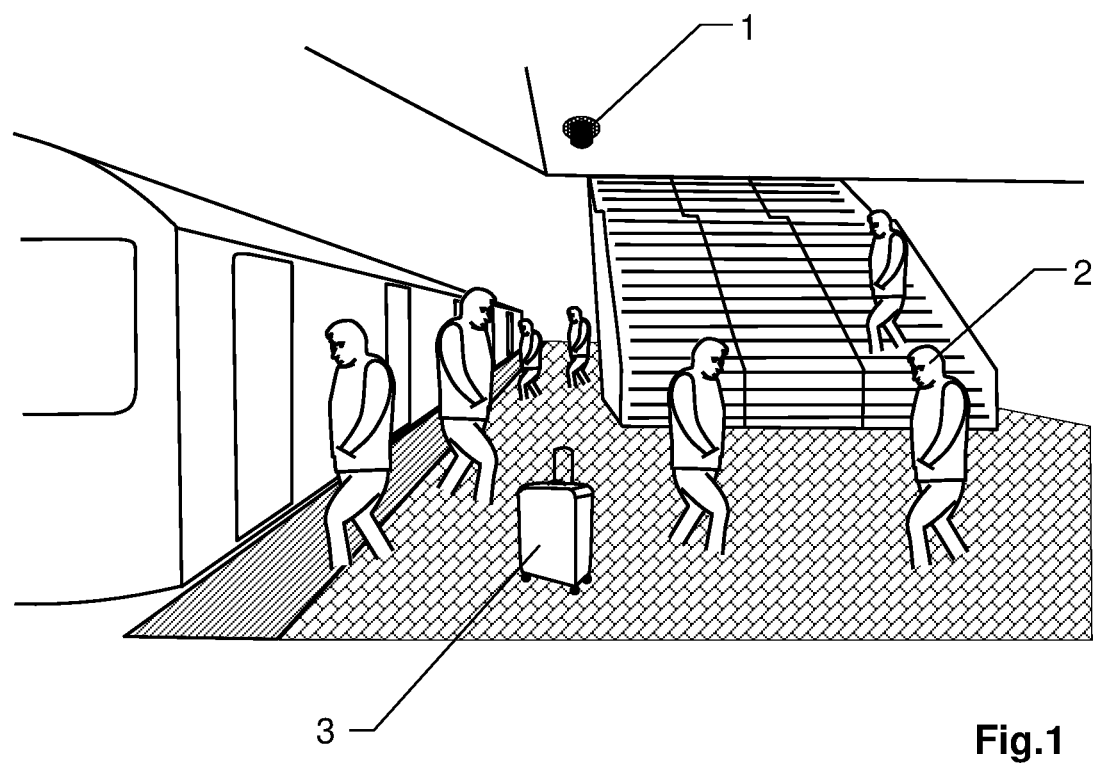
FIG. 1: shows an exemplary application of a reality capture device in the field of monitoring.

FIG. 1 shows an exemplary application of a reality capture device 1 in the field of monitoring, e.g. for monitoring a crowded subway station. Typically, such a monitoring system comprises a multitude of reality capture devices 1, which are distributed within the infrastructure in order to provide full coverage with a minimum of blind spots. For example, modern monitoring systems making use of a reality capture device in the sense of the invention are configured to automatically identify and track pedestrians 2 based on data from the reality capture device and to automatically detect a left behind object 3, e.g. a suitcase which could potentially comprise harmful substances or explosives.

Typically, reality capture devices 1 make use of a variety of different sensors, e.g. for visual and infrared imaging, range imaging, or 3D scanning Particularly for monitoring purposes, devices have to be compact, lightweight, and silent, while at the same being robust against destruction and manipulation. As some of the used sensors and electronics generate substantial heat, these requirements soon start to conflict typical cooling schemes wherein, for example, the use of large (and loud) fans, massive components and having an open device structure would be preferable.

Particularly the use of a laser scanning unit generates a large amount of internal heat, which has to be transported away from critical device components.

Figure 2:
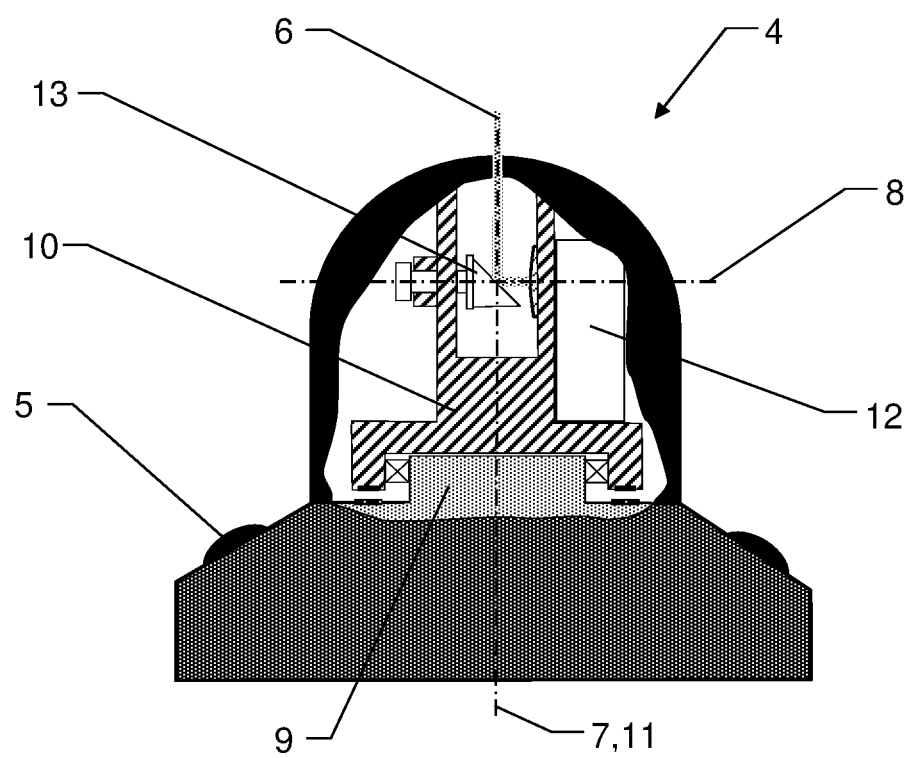
FIG. 2: shows an exemplary embodiment of a basic structure of a reality capture device according to the invention, comprising a laser scanner and imaging cameras.

FIG. 2 shows an exemplary embodiment of a basic structure of a reality capture device according to the invention, here comprising a laser scanner 4 and imaging cameras 5. By way of example, the laser scanner 4 is embodied as a 3D laser scanner providing a scanning movement of a laser measurement beam 6 with respect to two different, here two substantially orthogonal, rotation axes 7, 8.

The laser scanner 4 comprises a base 9 and a support 10, the support 10 being rotatably mounted on the base 9 about a support rotation axis 7, often defining a standing axis 11 of the laser scanner or the reality capture device, respectively. The rotation of the support 10 about the support rotation axis 7 is also called azimuthal rotation, regardless of whether the laser scanner, or the support rotation axis 7, is aligned exactly vertically.

The laser scanner 4 further comprises an optical distance measuring unit 12 arranged in the support 10 and configured to perform a distance measurement by emitting a transmission radiation 6, e.g. pulsed laser radiation, and by detecting returning parts of the transmission radiation by means of a receiving unit comprising a photosensitive sensor. Thus, a pulse echo is received from a backscattering surface point of the environment, wherein a distance to the surface point can be derived based on the time of flight, the shape, and/or the phase of the emitted pulse.

The scanning movement of the laser measurement beam 6 about the two rotation axes 7, 8 is carried out by rotating the support 10 relative to the base 9 about the support rotation axis 7 and by means of a rotating body 13, which is rotatably mounted on the support 10 and rotates about a beam rotation axis 8.

By way of example, both the transmission radiation 6 and the returning parts of the transmission radiation are deflected by means of a reflecting surface integral with the rotating body 13 or applied to the rotating body 13.

Alternatively, the transmission radiation may be coming from the side facing away from the reflecting surface, i.e. coming from the inside of the rotating body 13, and emitted into the environment via a passage area within the reflecting surface, e.g. by using a prism mounted inside the rotating body 13.

For the determination of the emission direction of the distance measuring beam 6 many different angle determining units are known in the prior art. For example, the emission direction may be detected by means of angle encoders, which are configured for the acquisition of angular data for the detection of absolute angular positions and/or relative angular changes of the support 10 about the support rotation axis 7, or of the rotating body 13 about the beam rotation axis 8, respectively. Another possibility is to determine the angular positions of the support 10 or the rotating body, respectively, by only detecting full revolutions and using knowledge of the set rotation frequency.

A visualization of the data and, for example, fusion with the camera data can be generated by using commonly known data processing steps and/or display options, e.g. wherein the acquired data is presented in the form of a 3D point cloud or wherein a 3D vector file model is generated.

Figure 3:
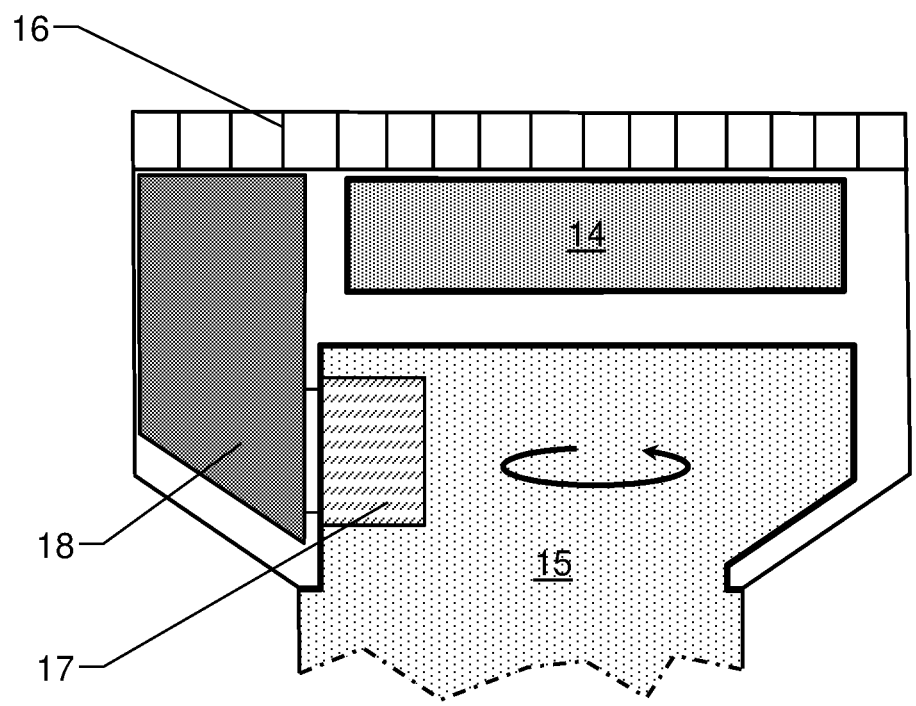
FIG. 3: exemplarily depicts the internal space of a reality capture device according to the invention, which has two different climate zones.

FIG. 3 exemplarily depicts the internal space of a reality capture device according to the invention, which has a first climate zone 14 and a second climate zone 15. Heat from the two climate zones 14, 15 is transported to the outside of the reality capture device by thermal conduction via heat dissipation elements (not shown), wherein outside parts 16 of the corresponding heat dissipation elements, e.g. cooling ribs or cooling fins, are exposed to an air flow generated by an air guiding arrangement (e.g. see FIG. 4).

According to one aspect of the invention, the first climate zone 14 is configured to be free of active air circulation and the second climate zone 15 is configured to have active air circulation for directing air to an inside part (a part inside the second climate zone) of the corresponding heat dissipation element, here, for example, embodied by the "cold side" 17 of a Peltier component (see below).

By way of example, in comparison to the second climate zone 15, the first climate zone 14 comprises less heat-sensitive components or components which generate less heat. For example, the second climate zone 15 comprises heat sensitive components of the laser scanner, e.g. a laser source for generating the laser measurement beam or a lidar detector, which have higher demands on temperature control as other components of the reality capture device, e.g. the electronics of the laser scanner.

For example, often the laser diode is one of the critical elements, e.g. wherein the diode is specified up to a maximum temperature of 70° C. In order to increase lifetime of the laser diode, the second climate zone 15 may then be temperature controlled such that during operation of the reality capture device the temperature of the second climate zone 15 is kept well below the specified maximum temperature of the laser diode, e.g. wherein the maximum nominal temperature of the second climate zone is 60° C. By way of example, the reality capture device is configured to provide a nominal temperature range of 45° C. to 60° C. within the second climate zone 15 during operation of the reality capture device.

In particular, the reality capture device is configured to provide a nominal temperature range for the second climate zone 15 during operation of the reality capture device having an upper nominal temperature boundary below 60° C., more particularly below 50° C.

In contrast, the requirements on the nominal temperature range of the first climate zone 14 can be more relaxed, e.g. wherein the first climate zone 14 comprises electronics of the laser scanner 4. By way of example, electronics for controlling and/or for data processing may tolerate a temperature of up to 70° C.

Thus, the nominal temperature range of the first climate zone 14 may be laid out to tolerate a mean temperature during operation of the reality capture device being close to 60° C. or even close to 70° C.

In the embodiment shown, the second climate zone 15 is cooled by using a Peltier component for actively pumping heat from a so-called "cold-side" 17 of the Peltier component to a so-called "hot-side" 18 of the Peltier component, which is connected to the cooling ribs 16.

Figure 4:
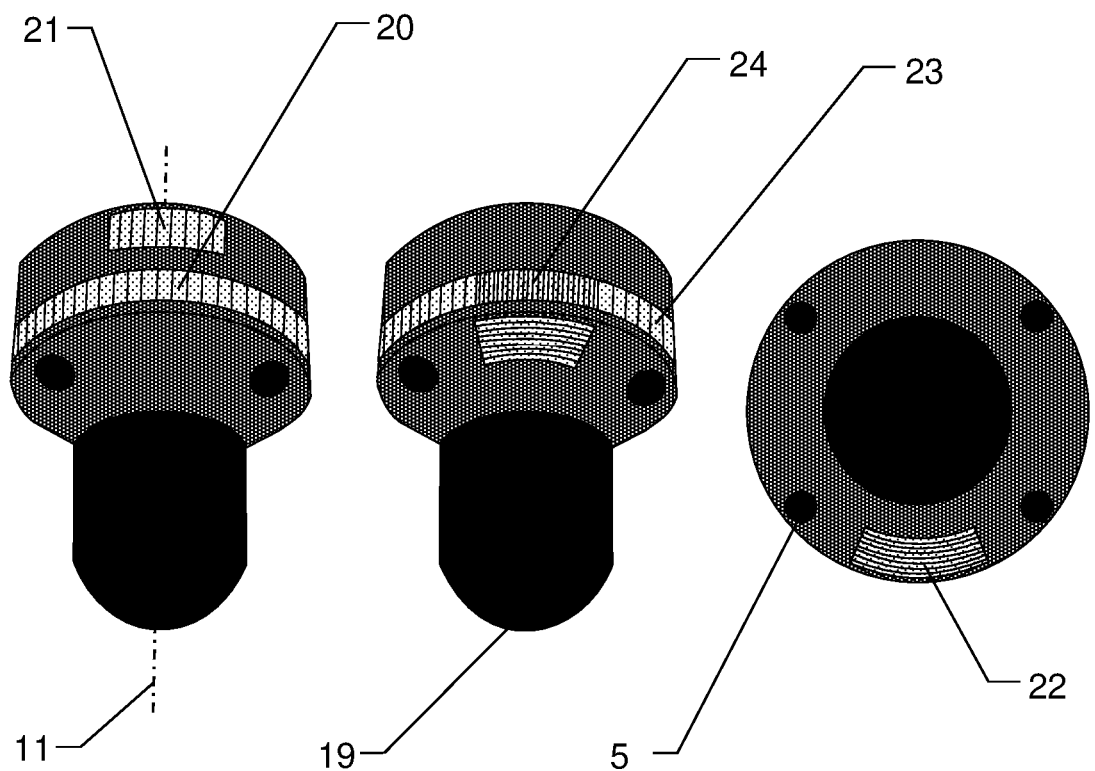
FIG. 4: shows three different external views onto an exemplary embodiment of the reality capture device having an air guiding arrangement according to the invention, two side views (left and middle illustration) rotated by 180 degrees with respect to each other and a top view (right illustration)

FIG. 4 shows three different views onto an exemplary embodiment of the reality capture device according to the invention, the left and middle illustrations being side views rotated by 180 degrees with respect to each other and the right illustration being a top view.

By way of example, the reality capture device comprises a laser scanner 4 and four cameras 5 arranged circumferentially around a standing axis 11 on the housing of the reality capture device. Here, the housing comprises a protective cover 19 and fully encloses the laser scanner 4. For example, the cover 19 is opaque for visible light and translucent for the wavelength range of the transmission radiation, e.g. wherein the transmission radiation is emitted at an infrared wavelength range. Therefore, the rotating parts of the laser scanner, e.g. as depicted by FIG. 2, are hidden by the cover 19, wherein the cover is in rest with respect to the base 9 (e.g. FIG. 2).

The reality capture device has a cooling arrangement having a fan (not shown) configured to provide active air circulation through an air guiding arrangement to discharge heat from the inside of the reality capture device to the surroundings, e.g. wherein the heat is discharged over cooling ribs or cooling fins exposed to the air flow generated by the air guiding arrangement. For example, cooling ribs are arranged at air inlets 20, here arranged circumferentially around the standing axis 11 of the reality capture device on a lateral surface of the reality capture device, wherein the air guiding arrangement provides for an air flow of ambient air through the air inlets 20 to an air outlet 21 for discharging the heated air to the surroundings. Additional air inlets 22 may be used to increase cooling power, e.g. for cooling of particularly hot components such as the "hot-side" of a Peltier component (e.g. see FIG. 3).

The air guiding arrangement is configured in such a way that different air flow characteristics of the active air circulation are achieved with respect to different regions. For example, the spacing of the cooling ribs varies along the circumference, e.g. the spacing between cooling ribs of a first region 23 associated to the cooling of the first climate zone 14 (see FIG. 3) is wider than the spacing between cooling ribs of a second region 24 associated to the cooling of the second climate zone 15.

Figure 5:
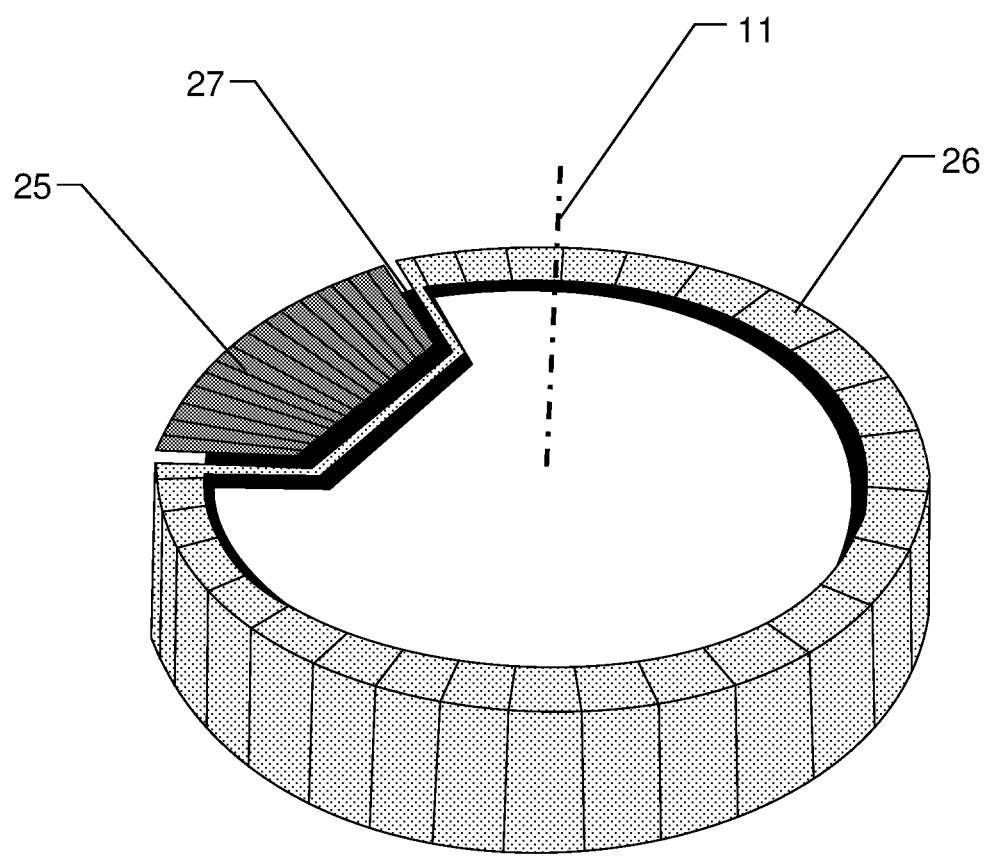
FIG. 5: schematically depicts an embodiment of an exemplary structure of the air guiding arrangement having two sections being insulated against heat conduction from one to the other.

FIG. 5 schematically depicts an embodiment of an exemplary structure of the air guiding arrangement. Here, the air guiding arrangement comprises two sections 25, 26, which are insulated by an insulation layer 27 against heat conduction from one to the other.

By way of example, one of the sections 25 has narrower air ducts than the other section 26 and is thermally connected to the second climate zone 15 comprising heat intensive and/or heat sensitive components of the laser scanner (see FIG. 3), wherein the other section 26 is thermally connected to the first climate zone comprising comparatively less heat-sensitive components such as processing electronics. Therefore, a thermal shortcut between the two climate zones is inhibited.

In order to enforce air flow through the air ducts the air guiding arrangement may comprise a covering cap (not shown). By way of example, the cooling ribs may be manufactured in an extrusion process such that the shape and arrangement of the cooling ribs defines the air flow characteristics provided by the air guiding arrangement. The covering cap may be out of plastic.

Although the invention is illustrated above, partly with reference to some preferred embodiments, it must be understood that numerous modifications and combinations of different features of the embodiments can be made. All of these modifications lie within the scope of the appended claims.

The invention claimed is:

1. Reality capture device for generating a digital representation of an environment, comprising a laser scanner, configured to provide a scanning movement of a laser measurement beam for generating lidar data, and a housing enclosing an internal space comprising at least part of the laser scanner,
characterized in that
the reality capture device is configured such that the internal space has a first climate zone and a second climate zone, wherein each of the climate zones is connected to a corresponding heat dissipation element and each heat dissipation element is configured to transport heat from an inside part of the heat dissipation element arranged inside the corresponding climate zone to an outside part of the heat dissipation element arranged outside the corresponding climate zone, and
the reality capture device has a common air circulation element configured to provide active air circulation through an air guiding arrangement for cooling the outside parts of the heat dissipation elements, wherein the air guiding arrangement is configured in such a way that different air flow characteristics of the active air circulation are achieved with respect to different regions associated with cooling of the outside parts of the heat dissipation elements.

2. Reality capture device according to claim 1, wherein the air guiding arrangement comprises air ducts of different shape and/or dimensions to provide the different air flow characteristics in the different regions.

3. Reality capture device according to claim 1, wherein
the air guiding arrangement comprises sections which are insulated against heat conduction from one to the other, particularly wherein the second climate zone is connected by thermal conduction to a section of the air guiding arrangement which is insulated against heat conduction from the rest of the air guiding arrangement.

4. Reality capture device according to claim 1 wherein
the air guiding arrangement extends on a lateral surface of the reality capture device at least along a part of the circumference around a standing axis of the reality capture device, in particular the air guiding arrangement extends along the entire circumference around the standing axis.

5. Reality capture device according to claim 1, wherein
the air guiding arrangement comprises cooling ribs associated with the cooling of the outside parts of the heat dissipation elements, wherein the cooling ribs have varying spacing between each other, particularly wherein the cooling ribs are arranged at least along a part of the circumference around the standing axis on the lateral surface of the reality capture device and spacing between the cooling ribs varies along the circumference.

6. Reality capture device according to claim 5, wherein
the spacing between cooling ribs configured for cooling of the second climate zone is smaller than the spacing between cooling ribs configured for cooling of the first climate zone.

7. Reality capture device for generating a digital representation of an environment, comprising a laser scanner, configured to provide a scanning movement of a laser measurement beam for generating lidar data, and a housing enclosing an internal space comprising at least part of the laser scanner,
wherein
the reality capture device is configured such that the internal space has a first climate zone and a second climate zone, wherein each of the climate zones is connected to a corresponding heat dissipation element and each heat dissipation element is configured to transport heat from an inside part of the heat dissipation element arranged inside the corresponding climate zone to an outside part of the heat dissipation element arranged outside the corresponding climate zone, and
the first climate zone is configured to be free of active air circulation and the second climate zone is configured to have active air circulation for directing air to the inside part of the corresponding heat dissipation element.

8. Reality capture device according to claim 1, wherein
the first climate zone comprises at least part of the electronics of the laser scanner, particularly a computing unit for controlling the laser scanner and/or for data processing, more particularly for processing the lidar data or laser scanner data comprising the lidar data and angular data of the scanning movement of the laser measurement beam.

9. Reality capture device according to claim 1, wherein
the laser scanner has a static section being comprised in the first climate zone and being free of rotating parts of the laser scanner.

10. Reality capture device according to claim 1, wherein
the second climate zone comprises at least one of a radiation source for generating the laser measurement beam, an optical component configured to interact with the laser measurement beam, and a detector for receiving at least part of the laser measurement beam.

11. Reality capture device according to claim 1, wherein
the laser scanner has a moving section being comprised in the second climate zone and comprising rotating parts for providing the scanning movement of the laser measurement beam.

12. Reality capture device according to claim 1, wherein
the second climate zone is sealed off with at least IP67 against external penetration.

13. Reality capture device according to claim 1, wherein
the heat dissipation element of the second climate zone is configured to actively generate a heat transfer from the inside part to the outside part of the heat dissipation element, particularly based on the Peltier effect.

14. Reality capture device according to claim 1, wherein
the reality capture device comprises an insulating arrangement insulating the second climate zone against heat conduction from the rest of the reality capture device.

* * * * *